(12) United States Patent
Shen et al.

(10) Patent No.: US 7,649,950 B2
(45) Date of Patent: Jan. 19, 2010

(54) OFDM TRANSMITTER THAT PERFORMS A PEAK REDUCTION PROCESS ON A TRANSMISSION SIGNAL SEQUENCE

(75) Inventors: Jiyun Shen, Yokohama (JP); Hiromasa Fujii, Yokosuka (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 622 days.

(21) Appl. No.: 11/353,148

(22) Filed: Feb. 14, 2006

(65) Prior Publication Data

US 2006/0193393 A1 Aug. 31, 2006

(30) Foreign Application Priority Data

Feb. 16, 2005 (JP) ............... 2005-039174

(51) Int. Cl.
*H04L 27/28* (2006.01)
(52) U.S. Cl. ............... 375/260; 375/296
(58) Field of Classification Search ............... 370/203, 370/206, 210, 208; 375/295, 296, 297, 259, 375/260, 316, 346, 350; 381/94.1, 94.8
See application file for complete search history.

(56) References Cited

U.S. PATENT DOCUMENTS

| | | | | |
|---|---|---|---|---|
| 6,240,141 | B1 * | 5/2001 | Long | 375/260 |
| 6,556,557 | B1 | 4/2003 | Cimini, Jr. et al. | |
| 7,095,798 | B2 * | 8/2006 | Hunton | 375/296 |
| 2003/0179832 | A1 * | 9/2003 | Greenwood et al. | 375/297 |
| 2004/0160893 | A1 * | 8/2004 | Park et al. | 370/206 |
| 2004/0203430 | A1 * | 10/2004 | Morris | 455/67.11 |
| 2005/0063485 | A1 * | 3/2005 | Hasegawa et al. | 375/296 |
| 2005/0265226 | A1 | 12/2005 | Shen et al. | |
| 2005/0265468 | A1 * | 12/2005 | Fujii et al. | 375/260 |
| 2006/0104373 | A1 * | 5/2006 | Bar-Ness et al. | 375/260 |

OTHER PUBLICATIONS

A. D. S. Jayalath, et al., "Reduced complexity PTS and new phase sequences for SLM to reduce PAP of an OFDM signal", VTC 2000-Spring. 2000, IEEE 51st. Vehicular Technology Conference Proceedings, vol. 3 of 3, XP-000968337, May 15, 2000, pp. 1914-1917.

(Continued)

*Primary Examiner*—Seema S Rao
*Assistant Examiner*—Khoa Huynh
(74) *Attorney, Agent, or Firm*—Oblon, Spivak, McClelland, Maier & Neustadt, L.L.P.

(57) ABSTRACT

An OFDM transmitter that performs a peak reduction process in a stepwise manner on a signal sequence to be transmitted. The transmitter includes a dividing IFFT unit that divides a signal sequence into a plurality of signal sequences and IFFTs each of the signal sequences to obtain time signal sequences. Then, a first peak reduction processing unit cyclically shifts a first one of the time signal sequences by a first amount of cyclic shift obtained based on a first threshold to obtain a first cyclically shifted time signal sequence, and adds the first cyclically shifted time signal sequence and a second one of the time signal sequences. Meanwhile, a second peak reduction processing unit cyclically shifts a third one of the time signal sequences by a second amount of cyclic shift obtained based on a second threshold to obtain a second cyclically shifted time signal sequence.

16 Claims, 12 Drawing Sheets

OTHER PUBLICATIONS

Xiaodong Li, et al., "Effects of Clipping and Filtering on the Performance of OFDM", IEEE Communications Letters, vol. 2, No. 5, May 1998, pp. 131-133.

Leonard J. Cimini, Jr., et al., "Peak-to-Average Power Ratio Reduction of an OFDM Signal Using Partial Transmit Sequences", IEEE Communications Letters, vol. 4, No. 3, Mar. 2000, pp. 86-88.

G. Hill, et al. "Cyclic Shifting and Time Inversion of Partial Transmit Sequences to Reduce the Peak-to-Average Power Ratio in OFDM", PIMRC 2000, vol. 2, Sep. 2000, pp. 1256-1259.

Xia Lei, et al., "A Minimum Clipping Power Loss Scheme for Mitigating the Clipping Noise in OFDM", Globecom 2003, IEEE, vol. 1, Dec. 2003, pp. 6-9.

\* cited by examiner

OFDM TRANSMITTER THAT PERFORMS A PEAK REDUCTION PROCESS ON A TRANSMISSION SIGNAL SEQUENCE

FIELD OF THE INVENTION

The present invention generally relates to a wireless communication technique, and more particularly, to a wireless transmitter employing orthogonal frequency division multiplexing (OFDM).

BACKGROUND OF THE INVENTION

In mobile communication, orthogonal frequency division multiplexing (OFDM) is attracting attention as one of multicarrier transmission schemes capable of reducing intersymbol interference in the multipath environment. However, with an OFDM scheme using sub-carrier modulation, the multicarrier-modulated signal, namely, the output of inverse fast Fourier transform (IFFT) has large peak amplitude as compared with the average level.

For this reason, peak to average power ratio (PAPR) increases, and nonlinear distortion is generated as illustrated in FIG. 1. This problem is an attribute of multicarrier modulation and caused by the following reason. When signal components of individually modulated multiple carriers are combined in phase, the adder output for a certain signal at a certain point of time become extremely high, and consequently, the combined signal has a large peak as compared with the average output level.

FIG. 2 is a graph showing an input/output characteristic of a typical transmission amplifier. As illustrated in FIG. 2, the region with a linear input/output characteristic is limited. The signal component beyond this linear region is clipped, and a signal is output with a distorted peak. This causes degradation of transmission quality and increases an out-of-band radiation power level. It is known that if the linear region is expanded, the amplification efficiency falls. Accordingly, it is desired for the amplitude (power level) distribution of a transmission signal to contain as little signal component with large amplitude as compared with the average as possible.

FIG. 3 and FIG. 4 are block diagrams of a typical OFDM transmitter and a typical OFDM receiver, respectively. In the OFDM transmitter shown in FIG. 3, a signal generator 1001 performs error correction encoding, interleaving, and symbol mapping on an input information bit sequence to produce transmission symbols. The transmission symbols are subjected to serial-to-parallel conversion at the serial-to-parallel (S/P) converter 1002 and converted into multiple parallel signal sequences. The S/P converted signal is subjected to inverse fast Fourier transform at IFFF unit 1003. The signal is further subjected to parallel-to-serial conversion at the parallel-to-serial (P/S) convert converter 1004, and converted into a signal sequence, as illustrated in FIG. 5. Then, guard intervals are added by the guard interval (GI) adding unit 1005, amplified at the power amplifier 1006, and finally transmitted as an OFDM signal by radio.

On the other hand, at the OFDM receiver shown in FIG. 4, the guard interval is removed from the received signal at the guard interval removing unit 2001. Then, the received signal is subjected to serial-to-parallel conversion at S/P converter 2002, fast Fourier transform at the FFT unit 2003, and parallel-to-serial conversion at P/S converter 2004, as illustrated in FIG. 5. Then, the received OFDM signal is detected to acquire the transmitted information.

To solve the above-described PAPR (Peak to Average Power Ratio) issue in an OFDM transmission scheme, various methods for reducing the peak amplitude (power level) are proposed. Such proposals include a frequency domain interleaving method, a clipping filtering method (See, for example, X. Li and L. J. Cimini, "Effects of Clipping and Filtering on the Performance of OFDM", IEEE Commun. Lett., Vol. 2, No. 5, pp. 131-133, May, 1998), a partial transmit sequence (PTS) method (See, for example, L. J Cimini and N. R. Sollenberger, "Peak-to-Average Power Ratio Reduction of an OFDM Signal Using Partial Transmit Sequences", IEEE Commun. Lett., Vol. 4, No. 3, pp. 86-88, March, 2000), and a cyclic shift sequence (CSS) method (See, for example, G. Hill and M. Faulkner, "Cyclic Shifting and Time Inversion of Partial Transmit Sequences to Reduce the Peak-to-Average Ratio in OFDM", PIMRC 2000, Vol. 2, pp. 1256-1259, Sep. 2000).

In addition, to improve the receiving characteristic in OFDM transmission when a non-linear transmission amplifier is used, a PTS method using a minimum clipping power loss scheme (MCPLS) is proposed to minimize the power loss clipped by a transmission amplifier (See, for example, Xia Lei, Youxi Tang, Shaoqian Li, "A Minimum Clipping Power Loss Scheme for Mitigating the Clipping Noise in OFDM", GLOBECOM 2003, IEEE, Vol. 1, pp. 6-9, Dec. 2003). The MCPLS is also applicable to a cyclic shifting sequence (CSS) method.

FIG. 6 is a block diagram of an OFDM transmitter employing MCPLS cyclic shifting sequence. In this example, subcarriers are grouped into two blocks. FIG. 7 is a block diagram of a dividing IFFT unit 1013 used in the OFDM transmitter shown in FIG. 6 and configured to divide eight subcarriers into two blocks.

The dividing IFFF unit 1013 produces two time signal sequences, namely, a first subsequence containing signal components of subcarriers 0 through 3, and a second subsequence containing signal components of subcarriers 4 through 7. In ordinary OFDM signal generation, the two groups of time signal sequences are added and the combined signal is output as a transmission signal. However, with CSS, phase rotation is applied to a portion of time signal sequences, and then added to the other portion of the time signal sequences. In addition, in CSS, cyclic shifting is applied to a portion of the time signal sequences at the cyclic shifting unit 1012, and added to the other portion of the time signal sequences, as illustrated in FIG. 6. By preparing multiple levels of cyclic shifting, multiple candidates are produced for a same transmission signal sequence. The PAPR reduction control unit 1011 using MCPLS detects a total of exceeding power over the reference level for each of the time signal sequences output from the dividing IFFF unit 1013, and selects a signal sequence with the minimum exceeding power as a target signal sequence to be transmitted.

In a partial transmit sequence (PTS) scheme, an appropriate set of phase rotation values determined for the respective subcarriers in advance is selected from multiple sets, and the selected set of phase rotations is used to rotate the phase of each of the subcarriers before signal modulation in order to reduce the peak to average power ratio (See, for example, S. H. Muller and J. B. Huber, "A Novel Peak Power Reduction Scheme for OFDM", Proc. of PIMRC '97, pp. 1090-1094, 1997; and G. R. Hill, Faulkner, and J. Singh, "Deducing the Peak-to-Average Power Ratio in OFDM by Cyclically Shifting Partial Transmit Sequences", Electronics Letters, Vol. 36, No. 6, 16th Mar., 2000).

FIG. 8 and FIG. 9 are block diagrams of an OFDM transmitter and an OFDM receiver, respectively, which employ a partial transmit sequence (PTS) scheme. In FIG. 8, the signal sequences generated by the signal generator 1001 is divided into two groups by the dividing unit 1031 of the dividing IFFF unit 1023. Serial-to-parallel conversion and inverse fast Fourier transform are performed on each of the divided groups.

Each of the IFFT units 1033 has N input/output points to receive N/2 signals from the S/T converter 1032 and N/2 null symbols. The phase rotation control unit 1021 determines an appropriate set of phase rotations or weighting values (θ1, θ2, . . . ), and one of the elements of the set is applied to the multipliers 1034 in common. In this manner, the outputs of the IFFT units 1033-1 and 1033-2 are combined under appropriate weighting at adders 1035.

The combined signal sequences are subjected to parallel-to-serial conversion at P/S unit 1004, a guard interval is added to the serial signal at guard interval unit 1005, and the signal is finally transmitted from the antenna.

In the receiving end, the phase rotation is adjusted when the signal is demodulated, as illustrated in FIG. 9.

However, in the above-described prior art techniques, if the number of groups of the divided subcarriers and the number of cyclic shifting patterns increase, the candidates of the transmitted signal increase exponentially, and the computational workload is extremely increased.

SUMMARY OF THE INVENTION

To overcome the problem of the exponentially increased amount of computational workload, it may be proposed to determine a cyclic shift or a phase rotation for each block in a successive manner (referred to as a successive determination scheme or an iterating control scheme) or in multiple stages in parallel (referred to as a multi-stage determination scheme).

However, if a conventional minimum clipping power loss scheme (MCPLS) for minimizing the total of the exceeding portion over a fixed clipping level is applied to an OFDM transmitter using a nonlinear power amp, in combination of a successive determination scheme or a multi-stage determination scheme, another problem arises.

In the PAPR reduction control operation performed earlier than the last stage, the number of subcarriers contained in the signal sequence is less than the total number of subcarriers, and accordingly, the peak power level appearing in the output signal sequence is not so high. This means that sufficient PAPR reducing effect cannot be obtained, except for at the last stage of the PAPR reducing process.

Accordingly, the present invention provides an OFDM transmitter capable of reducing peak to average power ratio (PAPR) of a radio signal in an effective manner.

In the embodiment, two or more threshold values are determined so as to efficiently deal with successive iteration or multi-stage processing of PAPR reducing operations.

To be more precise, in one aspect of the invention, an OFDM transmitter configured to perform a peak reduction process on a signal sequence to be transmitted in a stepwise manner to transmit a peak processed transmission signal is provided. The OFDM transmitter comprises:

(a) a dividing inverse fast Fourier transform unit configured to divide the signal sequence to be transmitted into N signal sequences (N>2) and perform inverse fast Fourier transform on each of the divided signal sequences to output N time signal sequences;

(b) a threshold control unit configured to determine at least two threshold values used in the stepwise peak reduction process; and (c) a first peak reduction processing unit configured to determine a first cyclic shift to be applied to one of the time signal sequences based on a first one of the threshold values, produce a first cyclically shifted signal sequence according to the first cyclic shift, and output a first peak processed signal sequence based on the first cyclically shifted signal sequence, the first cyclic shift being determined such that an exceeding power level over the first threshold value in the first peak processed signal sequence becomes the minimum.

BRIEF DESCRIPTION OF THE DRAWINGS

Other features and advantages of the invention will become more apparent from the following detailed description when read in conjunction with the accompanying drawings, in which.

DETAILED DESCRIPTION OF THE PREFERRED EMBODIMENT

The preferred embodiment of the present invention is described below in conjunction with the attached drawings.

Figure 1:
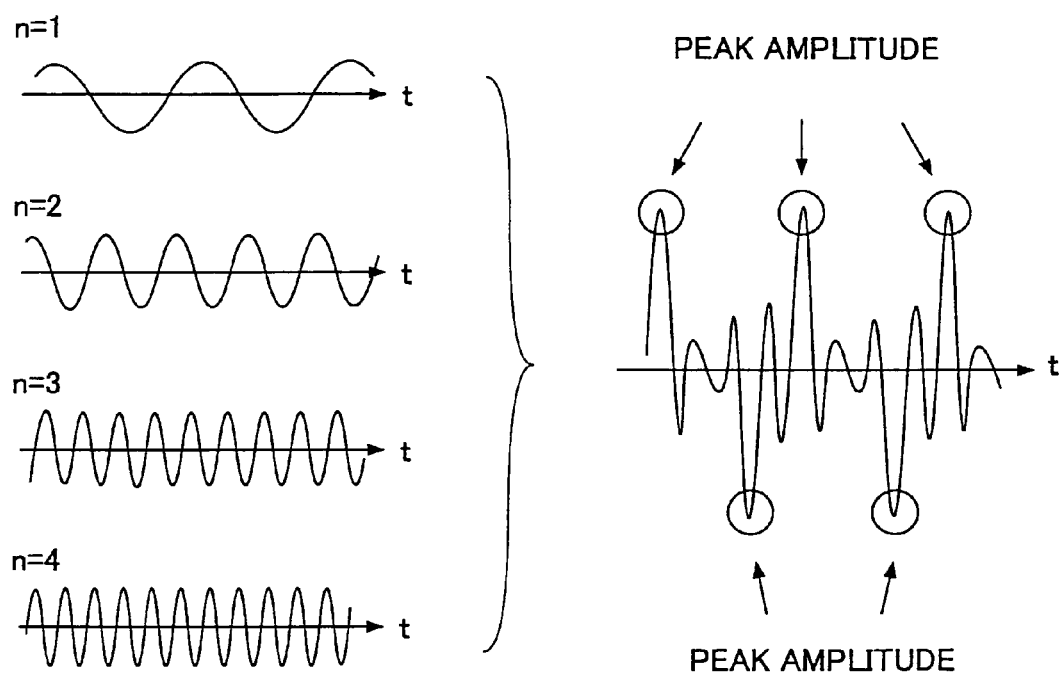
FIG. 1 is a schematic diagram illustrating an OFDM signal.
Figure 2:
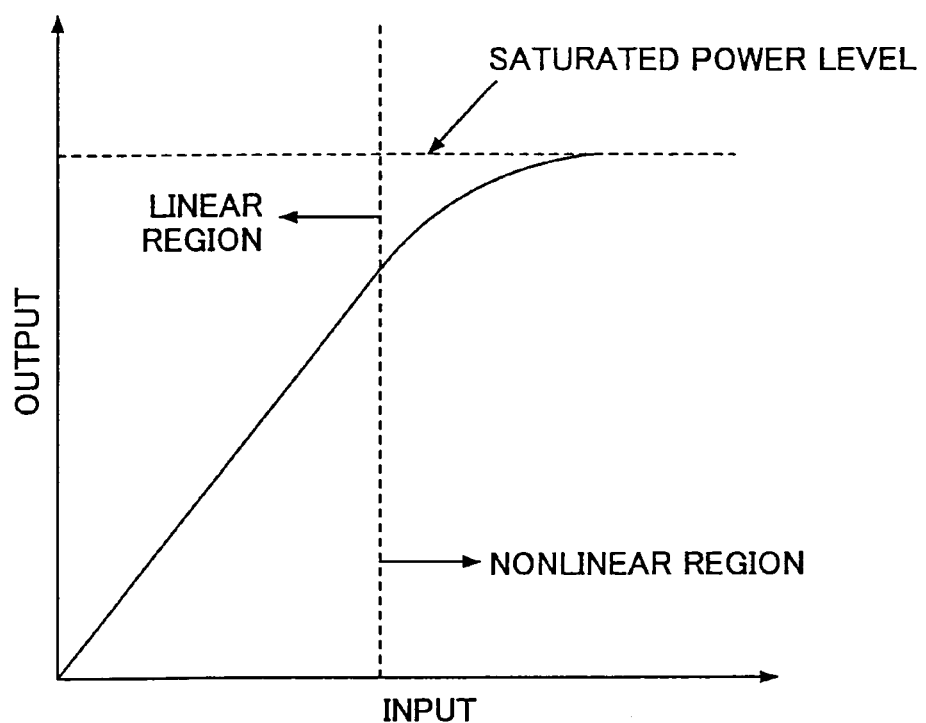
FIG. 2 is a graph showing an input/output characteristic of a power amp.
Figure 3:
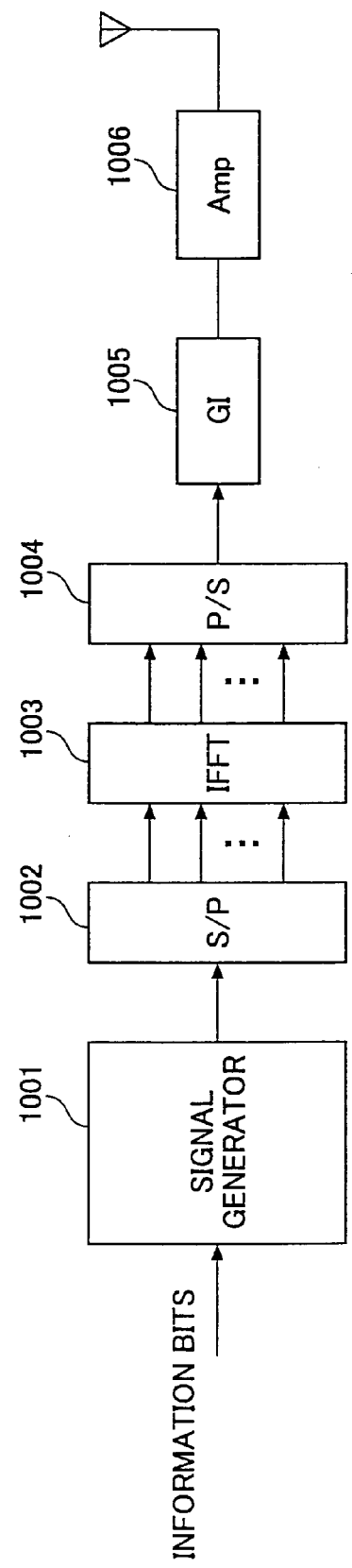
FIG. 3 is a schematic block diagram of a typical OFDM transmitter.
Figure 4:
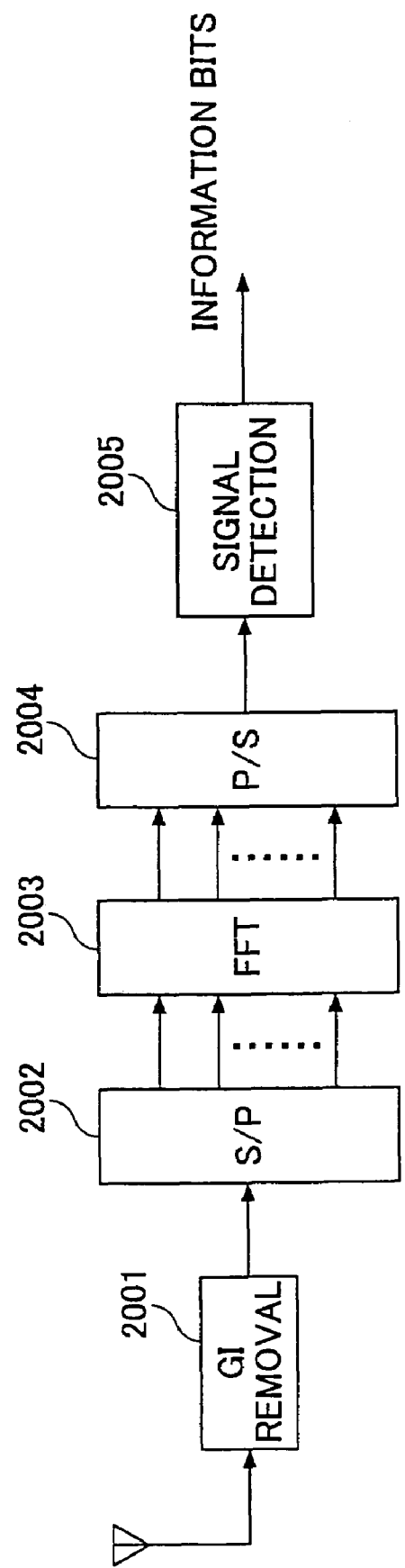
FIG. 4 is a schematic block diagram of a typical OFDM receiver.
Figure 5:
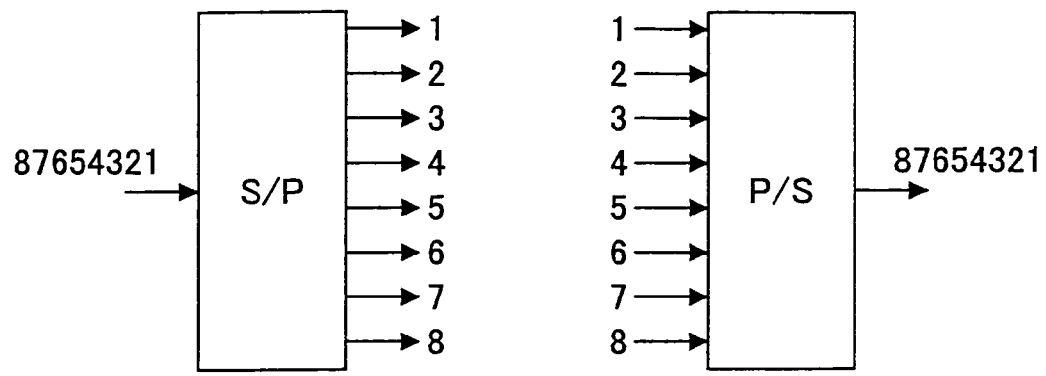
FIG. 5 illustrates an example of serial-to-parallel conversion and parallel-to-serial conversion.
Figure 6:
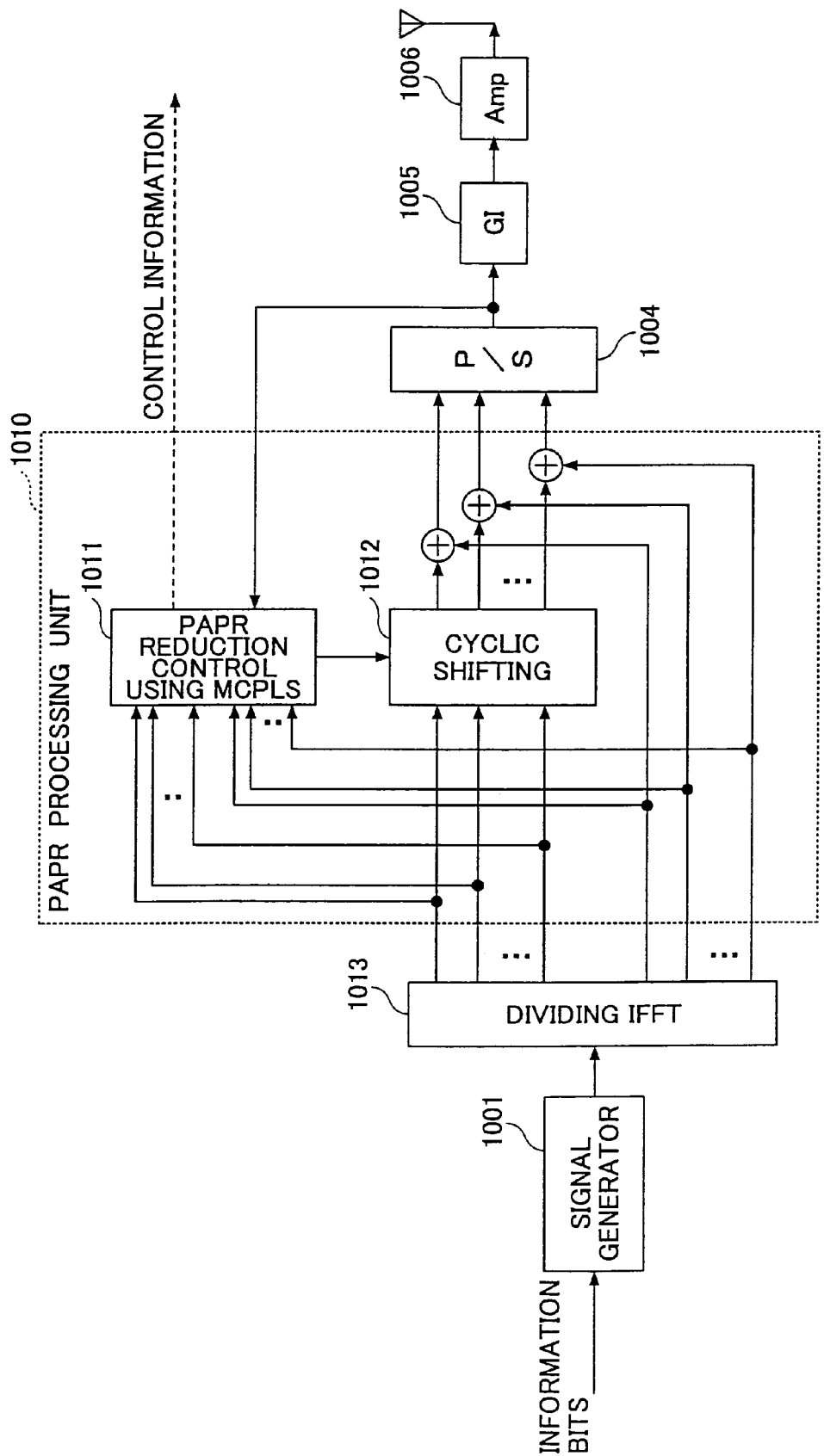
FIG. 6 is a schematic block diagram of an OFDM transmitter to which a cyclic shifting sequences (CSS) method and a minimum clipping power loss scheme (MCPLS) are applied.
Figure 7:
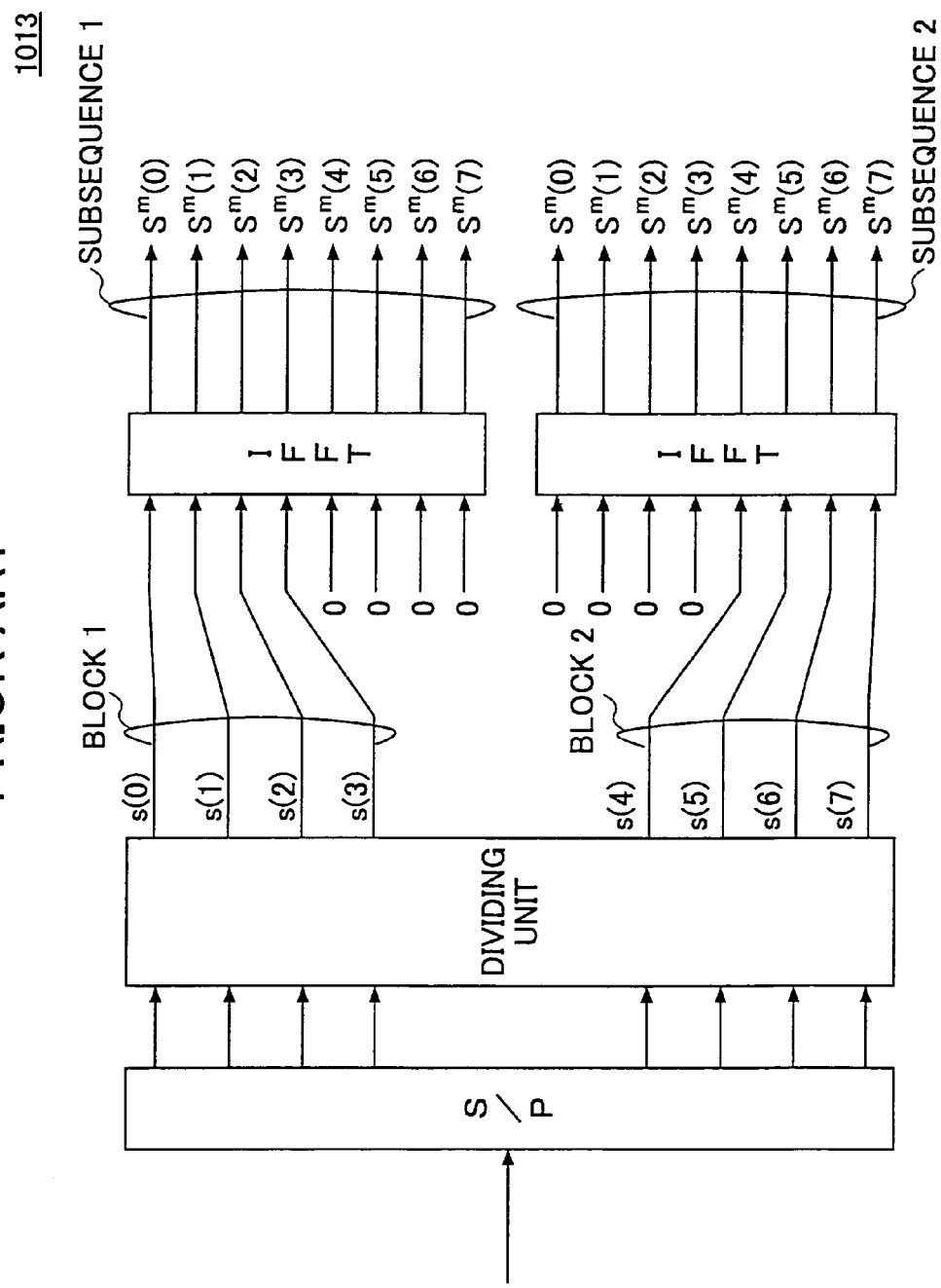
FIG. 7 illustrates signal processing in the dividing IFFT unit used in the OFDM transmitter shown in FIG. 6.
Figure 8:
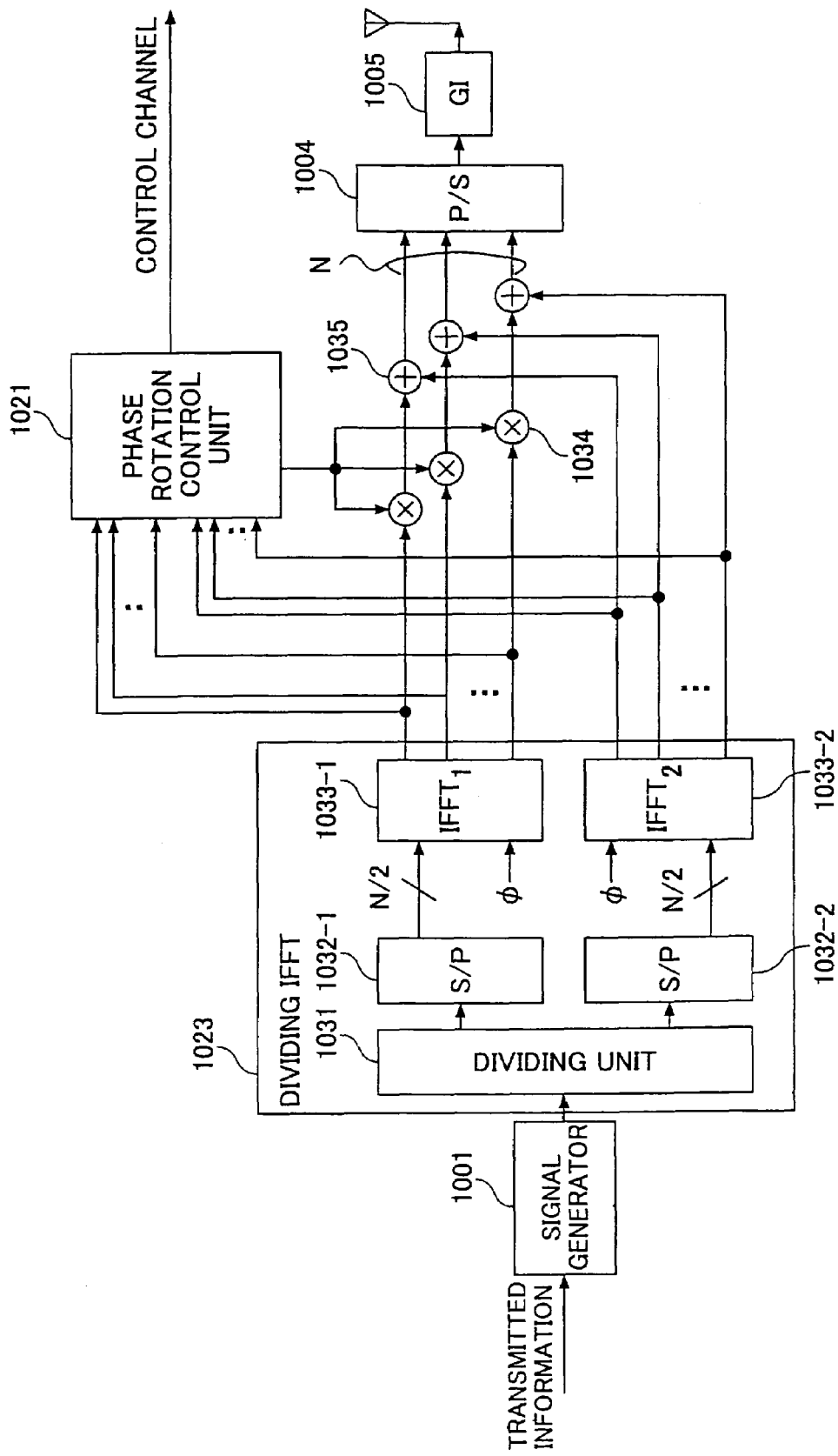
FIG. 8 is a schematic block diagram of an OFDM transmitter to which a partial transmit sequences (PTS) method is applied.
Figure 9:
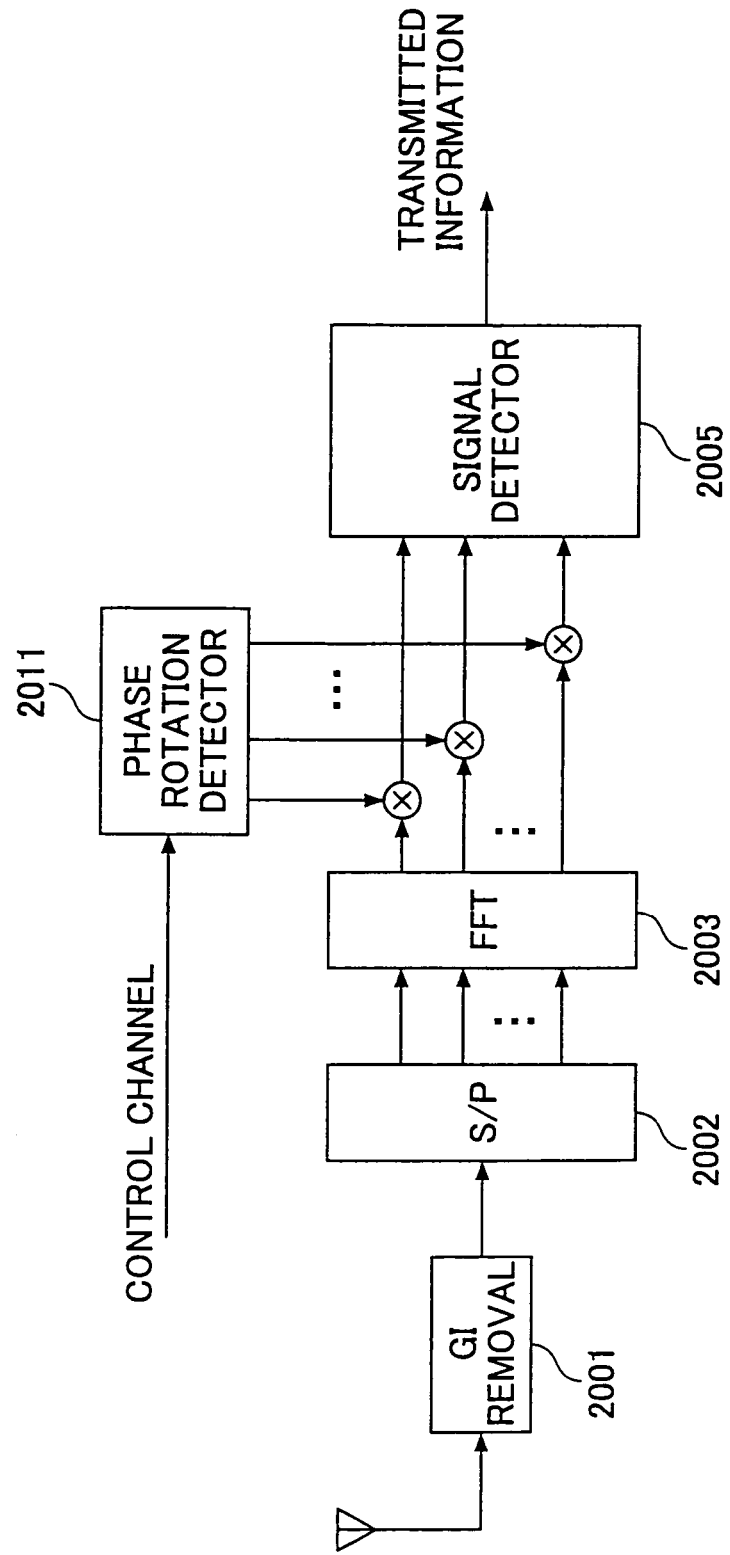
FIG. 9 is a schematic block diagram of an OFDM receiver to which a partial transmit sequences (PTS) method is applied.
Figure 10:
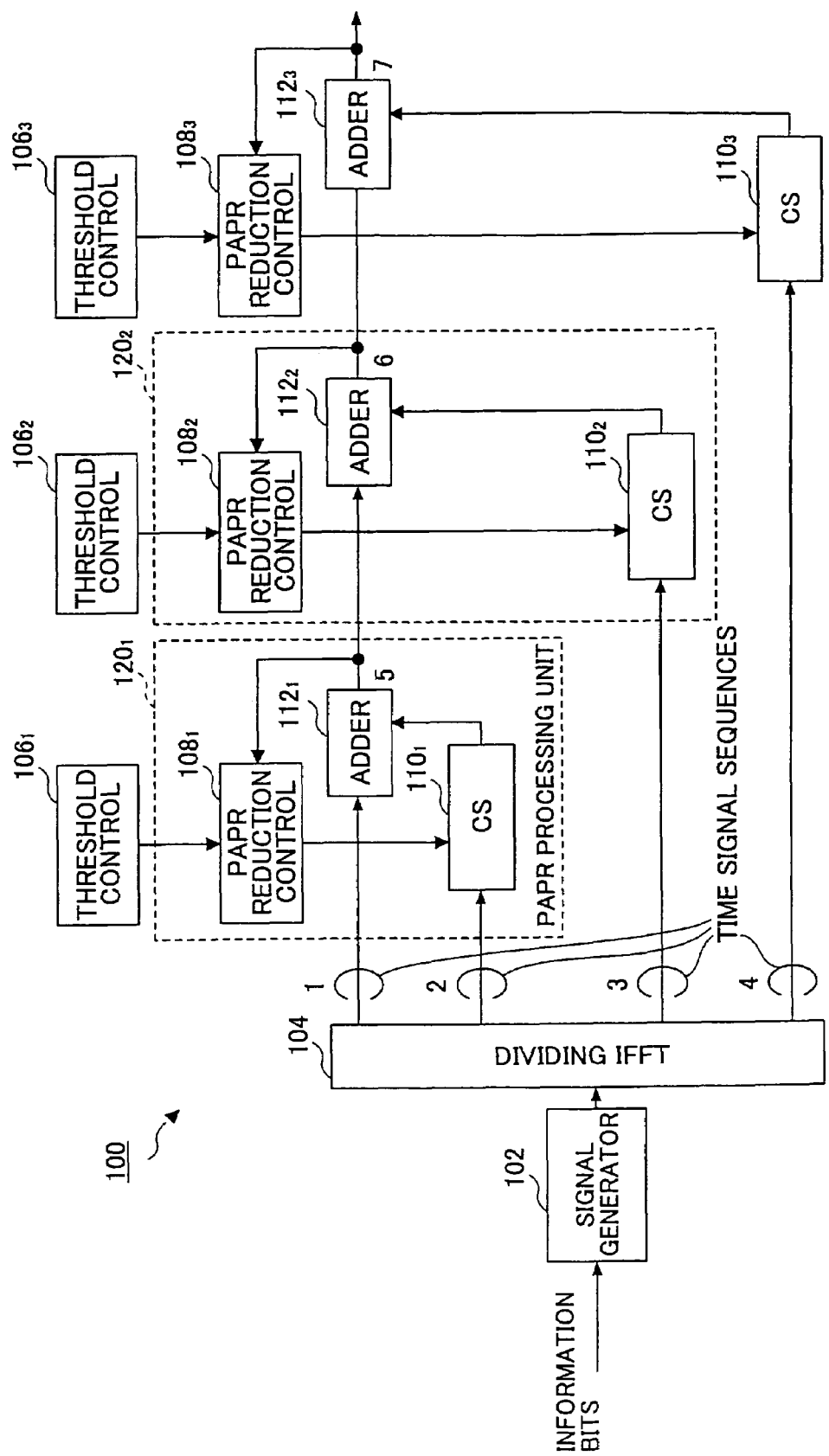
FIG. 10 is a schematic block diagram illustrating an OFDM transmitter according to an embodiment of the invention.

FIG. 10 is a schematic block diagram of an OFDM transmitter employing a successive determination scheme according to the first embodiment of the invention. In this embodiment, subcarriers are divided into four blocks by a dividing inverse fast Fourier transform (IFFT) unit.

A transmitter 100 includes a signal generator 102 to which information bits are input, and a dividing inverse fast Fourier transform (IFFT) unit 104 connected to the signal generator 102. The four outputs of the dividing IFFT unit 104 are supplied to an adder $112_1$, and three cyclic shifting units $110_1$, $110_2$ and $110_3$, respectively. The transmitter 100 also includes threshold control units $106_1$, $106_2$ and $106_3$, PAPR reduction control units $108_1$, $108_2$ and $108_3$, and adders $112_2$ and $112_3$ serially connected to the adder $112_1$. The threshold control unit $106_1$, is connected to the associated PAPR reduction control unit $108_1$, and the output of the PAPR reduction control unit $108_1$ is supplied to the associated cyclic shifting unit $110_1$. The output of the cyclic shifting unit $110_1$ is input to the adder $112_1$, and the output of the adder $112_1$ is fed back to the PAPR reduction control unit $108_1$. The PAPR reduction control unit $108_1$, the cyclic shifting unit $110_1$, and the adder $112_1$ structure a PAPR processing unit $120_1$. The output of the adder $112_1$ is supplied as the output of the PAPR processing unit $120_1$ to the next adder $112_2$.

Similarly, the threshold control unit $106_2$ is connected to the associated PAPR reduction control unit $108_2$ and the output of the PAPR reduction control unit $108_2$ is supplied to the associated cyclic shifting unit $110_2$. The output of the cyclic shifting unit $110_2$ is input to the adder $112_2$, and the output of the adder $112_2$ is fed back to the PAPR reduction control unit $108_2$. The PAPR reduction control unit $108_2$, the cyclic shifting unit $110_2$, and the adder $112_2$ structure a second PAPR processing unit $120_2$, and output of the second adder $112_2$ is supplied to the next adder $112_3$. The same configuration applies to the third set of threshold controller $106_3$, PAPR reduction control unit $108_3$, cyclic shifting unit $110_3$, and the adder $112_3$.

It is assumed that the number of subcarrier in the OFDM signal is N, and that the saturated power level of the transmission power amp to which the power level is clipped is PS. Although in general the maximum value of the linear portion of the input/output characteristic of the power amp is less than its saturated power level, the input/output characteristic can be linearized up to the saturated power level by applying predistorion. Accordingly, in this embodiment, the clipping level is assumed to equal the saturated power level of the power amp.

The signal generator 102 generates a signal component corresponding to each of the subcarriers based on the information bits representing the input signal to be transmitted, and outputs a signal sequence to the dividing IFFT unit 104.

The dividing IFFT unit 104 divides the received signal sequence into four signal sequences, and performs inverse fast Fourier transform on each of the divided signal sequences to produce four sets of inverse fast Fourier transformed signals, that is, four time signal sequences (which may be referred to simply as "signal sequences") 1, 2, 3 and 4. Signal sequence 1 is input to the first adder $112_1$, while signal sequences 2, 3 and 4 are input to the cyclic shifting units $110_1$, $110_2$, and $110_3$, respectively. Although in this embodiment, the input signal sequence is divided into four time signal sequences, it may be divided into two or more time signal sequences.

The threshold control unit $106_1$ sets a threshold $C_{th}$ used in a PAPR reducing process to a certain level $K_1$ lower than the saturated power level Ps ($C_{th}=K_1$, where $K_1$ is a constant and $K_1<Ps$), and supplies the threshold $C_{th}$ to the associated PAPR reduction control unit $108_1$.

The PAPR reduction control unit $108_1$ determines an amount of cyclic shift for signal sequence 2 such that the total exceeding power level over the threshold $C_{th}$ becomes the minimum in signal sequence 5 output from the first adder $112_1$, and supplies the determined amount of cyclic shift to the cyclic shifting unit $110_1$.

The cyclic shifting unit $110_1$ applies cyclic shift to the signal sequence 2 according to the amount of cyclic shift determined by the PAPR reduction control unit $108_1$, and supplies the cyclically shifted signal sequence 2 to the first adder $112_1$.

The adder $112_1$ adds the cyclically shifted signal sequence 2 to the signal sequence 1, and outputs a combined signal sequence 5 to the second adder $112_2$.

Similarly, threshold control unit $106_2$ sets a threshold $C_{th}$ used in the associated PAPR reducing process to a certain level $K_2$ lower than the saturated power level Ps ($C_{th}=K_2$, where $K_2$ is a constant and $K_2<Ps$), and supplies the threshold $C_{th}$ to the associated PAPR reduction control unit $108_2$. The threshold level $K_2$ may be different from or equal to $K_1$.

The PAPR reduction control unit $108_2$ determines an amount of cyclic shift for signal sequence 3 such that the total exceeding power level over the threshold $C_{th}$ becomes the minimum in signal sequence 6 output from the second adder $112_2$, and supplies the determined amount of cyclic shift to the cyclic shifting unit $110_2$.

The cyclic shifting unit $110_2$ applies cyclic shift to the signal sequence 3 according to the amount of cyclic shift determined by the PAPR reduction control unit $108_2$, and supplies the cyclically shifted signal sequence 3 to the second adder $112_2$.

The adder $112_2$ adds the cyclically shifted signal sequence 3 to the combined signal sequence 5 supplied from the first adder $112_1$, and outputs a combined signal sequence 6 to the third adder $112_3$.

The threshold control unit $106_3$ sets a threshold $C_{th}$ used in the associated PAPR reducing process to the saturated power level Ps ($C_{th}=Ps$), and supplies the threshold $C_{th}$ to the associated PAPR reduction control unit $108_3$.

The PAPR reduction control unit $108_3$ determines an amount of cyclic shift for signal sequence 4 such that the total exceeding power level over the threshold $C_{th}$ becomes the minimum in signal sequence 7 output from the third adder $112_3$, and supplies the determined amount of cyclic shift to the cyclic shifting unit $110_3$.

The cyclic shifting unit $110_3$ applies cyclic shift to the signal sequence 4 according to the amount of cyclic shift determined by the PAPR reduction control unit $108_3$, and supplies the cyclically shifted signal sequence 4 to the third adder $112_3$.

The adder $112_3$ adds the cyclically shifted signal sequence 4 to the combined signal sequence 6 supplied from the second adder $112_2$, and outputs a combined signal sequence 7 as an OFDM signal.

In this manner, multiple threshold control units 106 are provided corresponding to the successive processes of PAPR reduction, and an appropriate threshold value is set in each of the PAPR reducing processes to reduce the PAPR of the currently processed signal sequence. Because the PAPR reducing effect is improved in each of the successive processes, degradation of the receiving characteristic due to a nonlinear characteristic of a transmission amplifier can be prevented effectively, as compared with a conventional technique using a fixed threshold for clipping the exceeding power level.

Figure 11:
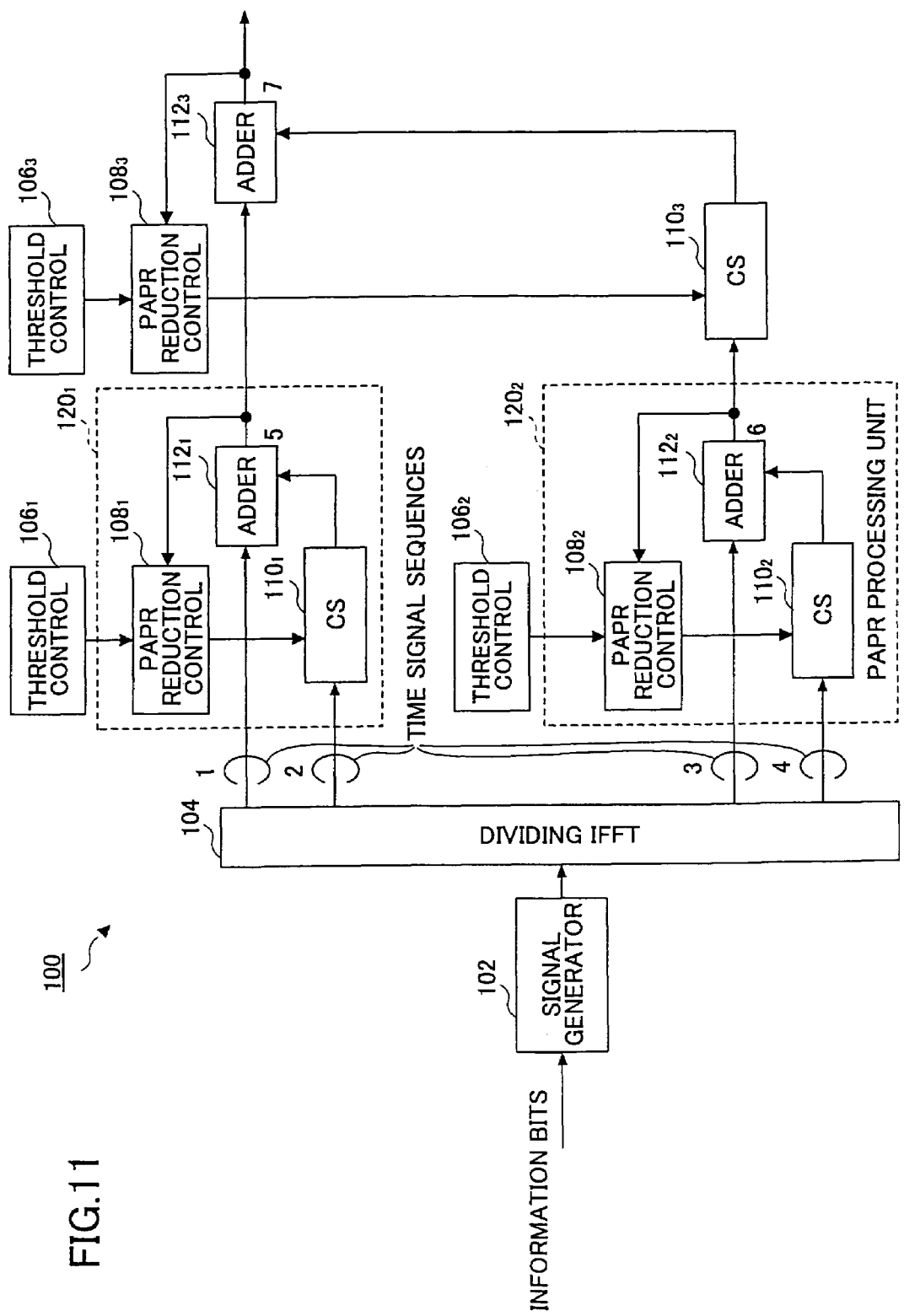
FIG. 11 is a schematic block diagram illustrating an OFDM transmitter according to another embodiment of the invention.

FIG. 11 is a schematic block diagram of an OFDM transmitter according to the second embodiment of the invention. In place of the successive determination scheme for determining cyclic shifts employed in the first embodiment, the OFDM transmitter of the second embodiment employs a multi-stage determination scheme for determining cyclic shifts to be applied to the divided OFDM subcarriers.

A transmitter 100 includes a signal generator 102 to which information bits are input, and a dividing inverse fast Fourier transform (IFFT) unit 104 connected to the signal generator 102. The four outputs of the dividing IFFT unit 104 are supplied to first and second adders $112_1$ and $112_2$ connected in parallel to the dividing IFFT unit 104 and first and second cyclic shifting units $110_1$ and $110_2$ connected in parallel to the dividing IFFT unit $104y$. The transmitter 100 also includes threshold control units $106_1$, $106_2$ and $106_3$, PAPR reduction control units $108_1$, $108_2$ and $108_3$, and adder $112_3$ serially connected to the adder $112_1$. The threshold control unit $106_1$ is connected to the associated PAPR reduction control unit $108_1$, and the output of the PAPR reduction control unit $108_1$ is supplied to the associated cyclic shifting unit $110_1$. The output of the cyclic shifting unit $110_1$ is input to the adder $112_1$, and the output of the adder $112_1$ is fed back to the PAPR reduction control unit $108_1$. The PAPR reduction control unit $108_1$, the cyclic shifting unit $110_1$, and the adder $112_1$ structure a PAPR processing unit $120_1$. The output of the adder $112_1$ is supplied to the serially connected adder $112_3$.

Similarly, the threshold control unit $106_2$ is connected to the associated PAPR reduction control unit $108_2$, and the output of the PAPR reduction control unit $108_2$ is supplied to the associated cyclic shifting unit $110_2$. The output of the cyclic shifting unit $110_2$ is input to the adder $112_2$, and the output of the adder $112_2$ is fed back to the PAPR reduction control unit $108_2$. The PAPR reduction control unit $108_2$, the cyclic shifting unit $110_2$, and the adder $112_2$ structure a second PAPR processing unit $120_2$, which is provided parallel to the first processing unit $120_1$ to constitute multi-stage PAPR processing. The output of the second adder $112_2$ is supplied to the cyclic shifting unit $110_3$.

The third adder $112_3$ configured to receive the output of the first adder $112_1$, the third cyclic shifting unit $110_3$ configured to receive the output of the second adder $112_2$, and the PAPR reduction control unit $108_3$ also structure a PAPR processing unit (not shown).

The signal generator 102 generates a signal component corresponding to each of the subcarriers based on the information bits representing the input signal to be transmitted, and outputs a signal sequence to the dividing IFFT unit 104.

The dividing IFFT unit 104 divides the received signal sequence into four signal sequences, and performs inverse fast Fourier transform on each of the divided signal sequences to produce four sets of inverse fast Fourier transformed signals, that is, four time signal sequences (which may be referred to simply as "signal sequences") 1, 2, 3 and 4. These signal sequences 1, 2, 3 and 4 are input to the first adder $112_1$, the first cyclic shifting unit $110_1$, the second adder $112_2$, and the second cyclic shifting unit $110_3$, respectively. Although in this embodiment, the input signal sequence is divided into four time signal sequences, it may be divided into two or more time signal sequences.

The threshold control unit $106_1$ sets a threshold $C_{th}$ used in a PAPR reducing process to a certain level $K_1$ lower than the saturated power level Ps ($C_{th}=K_1$, where $K_1$ is a constant and $K_1<Ps$), and supplies the threshold $C_{th}$ to the associated PAPR reduction control unit $108_1$.

The PAPR reduction control unit $108_1$ determines an amount of cyclic shift for signal sequence 2 such that the total exceeding power level over the threshold $C_{th}$ becomes the minimum in signal sequence 5 output from the first adder $112_1$, and supplies the determined amount of cyclic shift to the cyclic shifting unit $110_1$.

The cyclic shifting unit $110_1$ applies cyclic shift to the signal sequence 2 according to the amount of cyclic shift determined by the PAPR reduction control unit $108_1$, and supplies the cyclically shifted signal sequence 2 to the first adder $112_1$.

The adder $112_1$ adds the cyclically shifted signal sequence 2 to the signal sequence 1, and outputs a combined signal sequence 5 to the third adder $112_3$.

Similarly, threshold control unit $106_2$ sets a threshold $C_{th}$ used in the associated PAPR reducing process to a certain level $K_2$ lower than the saturated power level Ps ($C_{th}=K_2$, where $K_2$ is a constant and $K_2<Ps$), and supplies the threshold $C_{th}$ to the associated PAPR reduction control unit $108_2$. The threshold level $K_2$ may be different from or equal to $K_1$.

The PAPR reduction control unit $108_2$ determines an amount of cyclic shift for signal sequence 4 such that the total exceeding power level over the threshold $C_{th}$ becomes the minimum in signal sequence 6 output from the second adder $112_2$, and supplies the determined amount of cyclic shift to the cyclic shifting unit $110_2$.

The cyclic shifting unit $110_2$ applies cyclic shift to the signal sequence 4 according to the amount of cyclic shift determined by the PAPR reduction control unit $108_2$, and supplies the cyclically shifted signal sequence 4 to the second adder $112_2$.

The adder $112_2$ adds the cyclically shifted signal sequence 4 to the signal sequence 3, and outputs a combined signal sequence 6 to the cyclic shifting unit $110_3$.

The threshold control unit $106_3$ sets a threshold $C_{th}$ used in the associated PAPR reducing process to the saturated power level Ps ($C_{th}=Ps$), and supplies the threshold $C_{th}$ to the associated PAPR reduction control unit $108_3$.

The PAPR reduction control unit $108_3$ determines an amount of cyclic shift for the combined signal sequence 6 (obtained from signal sequence 3 and signal sequence 4) such that the total exceeding power level over the threshold $C_{th}$ becomes the minimum in signal sequence 7 output from the third adder $112_3$, and supplies the determined amount of cyclic shift to the cyclic shifting unit $110_3$.

The cyclic shifting unit $110_3$ applies cyclic shift to the signal sequence 6 according to the amount of cyclic shift determined by the PAPR reduction control unit $108_3$, and supplies the cyclically shifted signal sequence 6 to the third adder $112_3$.

The adder $112_3$ adds the cyclically shifted signal sequence 6 to the combined signal sequence 5 supplied from the first adder $112_1$, and outputs a combined signal sequence 7 as an OFDM signal.

In this manner, multiple threshold control units 106 are provided corresponding to the PAPR reducing processes performed with a multi-stage determination scheme, and an appropriate threshold value is set in each of the PAPR reducing processes to reduce the PAPR of the currently processed signal sequence. Because the PAPR reducing effect is improved in each of the successive processes, degradation of the receiving characteristic due to a nonlinear characteristic of a transmission amplifier can be prevented effectively, as compared with a conventional technique using a fixed threshold.

Next, the third embodiment of the invention is described in conjunction with FIG. 10. Since the basic structure of the OFDM transmitter of the third embodiment 1 is the same as that in the first embodiment, overlapping explanation is omitted.

In the third embodiment, the threshold $C_{th}$ set for PAPR reducing process is expressed as a function of the threshold control number, instead of a constant. In this embodiment, the number of OFDM subcarriers is N, the saturated power level of the power amp is Ps, and the subcarriers are divided into four signal sequences, as in the first embodiment. A successive determination scheme is also employed in the third embodiment.

The threshold control unit $106_1$ sets a threshold $C_{th}$ for a PAPR reducing process as a function of the number assigned to the threshold control unit $106$ ($C_{th}=f(x)$, where $f(x)$ is an increasing function, and x is the number assigned to the threshold control unit number). The determined threshold $C_{th}$ is supplied to the PAPR reduction control unit $108_1$.

The PAPR reduction control unit $108_1$ determines an amount of cyclic shift for signal sequence 2 such that the total exceeding power level over the threshold $C_{th}$ becomes the minimum in signal sequence 5 output from the first adder 112₁, and supplies the determined amount of cyclic shift to the cyclic shifting unit 110₁.

The cyclic shifting unit 110 applies cyclic shift to the signal sequence 2 according to the amount of cyclic shift determined by the PAPR reduction control unit 108₁, and supplies the cyclically shifted signal sequence 2 to the first adder 112₁.

The adder 112₁ adds the cyclically shifted signal sequence 2 to the signal sequence 1, and outputs a combined signal sequence 5 to the second adder 112₂.

The second threshold control unit 106₂ sets a threshold $C_{th}=f(x)$ for the associated PAPR reducing process, and supplies the threshold $C_{th}$ to the PAPR reduction control unit 108₂. This threshold value $C_{th}$ is increased from the previous threshold value $C_{th}$.

The PAPR reduction control unit 108₂ determines an amount of cyclic shift for signal sequence 3 such that the total exceeding power level over the threshold $C_{th}$ becomes the minimum in signal sequence 6 output from the second adder 112₂, and supplies the determined amount of cyclic shift to the cyclic shifting unit 110₂.

The cyclic shifting unit 110₂ applies cyclic shift to the signal sequence 3 according to the amount of cyclic shift determined by the PAPR reduction control unit 108₂, and supplies the cyclically shifted signal sequence 3 to the second adder 112₂.

The adder 112₂ adds the cyclically shifted signal sequence 3 to the combined signal sequence 5 supplied from the first adder 112₁, and outputs a combined signal sequence 6 to the third adder 112₃.

The threshold control unit 106₃ sets a threshold $C_{th}$ used in the associated PAPR reducing process to the saturated power level Ps ($C_{th}$=Ps), and supplies the threshold $C_{th}$ to the associated PAPR reduction control unit 108₃. Although, in this example, the threshold of the last step is set to the saturated power level, a value defined by the function f(x) may be used for the last threshold, as done for the previously determined threshold values.

The PAPR reduction control unit 108₃ determines an amount of cyclic shift for signal sequence 4 such that the total exceeding power level over the threshold $C_{th}$ becomes the minimum in signal sequence 7 output from the third adder 112₃, and supplies the determined amount of cyclic shift to the cyclic shifting unit 110₃.

The cyclic shifting unit 110₃ applies cyclic shift to the signal sequence 4 according to the amount of cyclic shift determined by the PAPR reduction control unit 108₃, and supplies the cyclically shifted signal sequence 4 to the third adder 112₃.

The adder 112₃ adds the cyclically shifted signal sequence 4 to the combined signal sequence 6 supplied from the second adder 112₂, and outputs a combined signal sequence 7 as an OFDM signal.

With the OFDM transmitter of the third embodiment, as the number assigned to the threshold control unit 106 increases, the number of subcarriers added to the previously produced time signal sequence increases, and consequently, the peak to average power ratio of the produced time sequence signal also increases. To make use of this phenomenon, the PAPR reduction (clipping) threshold $C_{th}$ used in the third embodiment is set as an increasing function of the number assigned to the threshold control unit 106. A threshold control unit produces a PAPR reducing threshold $C_{th}$ increased at a certain rate with respect to the previous threshold $C_{th}$ determined by the previous threshold control unit.

With this arrangement, the PAPR reducing effect is improved in each of the successive PAPR reducing processes, and degradation of the receiving characteristic due to a non-linear characteristic of a transmission amplifier can be prevented effectively, as compared with a case using a fixed threshold.

Next, the fourth embodiment of the invention is explained in conjunction with FIG. 11. In the fourth embodiment, a multi-stage determination scheme for determining a cyclic shift is applied to the OFDM transmitter in place of a successive determination scheme. The number of OFDM subcarriers is N, which is divided into four signal sequences by the dividing IFFT unit, and the saturated power level is Ps, as in the first through third embodiments.

The threshold control unit 106₁ sets a threshold $C_{th}$ as a function of the number x assigned to the threshold control unit 106 ($C_{th}$=f(x), where f(x) is an increasing function), and supplies the threshold $C_{th}$ to the associated PAPR reduction control unit 108₁.

The PAPR reduction control unit 108₁ determines an amount of cyclic shift for signal sequence 2 such that the total exceeding power level over the threshold $C_{th}$ becomes the minimum in signal sequence 5 output from the first adder 112₁, and supplies the determined amount of cyclic shift to the cyclic shifting unit 110₁.

The cyclic shifting unit 110₁ applies cyclic shift to the signal sequence 2 according to the amount of cyclic shift determined by the PAPR reduction control unit 108₁, and supplies the cyclically shifted signal sequence 2 to the first adder 112₁.

The adder 112₁ adds the cyclically shifted signal sequence 2 to the signal sequence 1, and outputs a combined signal sequence 5 to the third adder 112₃.

The second threshold control unit 106₂ sets a threshold $C_{th}$=f(x) (f(x) is an increasing function, and x is the number assigned to the threshold control unit 106), and supplies the threshold $C_{th}$ to the associated PAPR reduction control unit 108₂. This threshold value $C_{th}$ is increased from the previous threshold value $C_{th}$.

The PAPR reduction control unit 108₂ determines an amount of cyclic shift for signal sequence 4 such that the total exceeding power level over the threshold $C_{th}$ becomes the minimum in signal sequence 6 output from the second adder 112₂, and supplies the determined amount of cyclic shift to the cyclic shifting unit 110₂.

The cyclic shifting unit 110₂ applies cyclic shift to the signal sequence 4 according to the amount of cyclic shift determined by the PAPR reduction control unit 108₂, and supplies the cyclically shifted signal sequence 4 to the second adder 112₂.

The adder 112₂ adds the cyclically shifted signal sequence 4 to the signal sequence 3, and outputs a combined signal sequence 6 to the cyclic shifting unit 110₃.

The threshold control unit 106₃ sets a threshold $C_{th}$ used in the associated PAPR reducing process to the saturated power level Ps ($C_{th}$=Ps), and supplies the threshold $C_{th}$ to the associated PAPR reduction control unit 108₃. Although, in this example, the last threshold is set equal to the saturated power level, a value defined by the function f(x) may be used for the last threshold, as for the previously determined threshold values.

The PAPR reduction control unit 108₃ determines an amount of cyclic shift for the combined signal sequence 6 (obtained from signal sequence 3 and signal sequence 4) such that the total exceeding power level over the threshold $C_{th}$ becomes the minimum in signal sequence 7 output from the third adder 112₃, and supplies the determined amount of cyclic shift to the cyclic shifting unit 110₃.

The cyclic shifting unit $110_3$ applies cyclic shift to the signal sequence 6 according to the amount of cyclic shift determined by the PAPR reduction control unit $108_3$, and supplies the cyclically shifted signal sequence 6 to the third adder $112_3$.

The adder $112_3$ adds the cyclically shifted signal sequence 6 to the combined signal sequence 5 supplied from the first adder $112_1$, and outputs a combined signal sequence 7 as an OFDM signal.

In this manner, the threshold $C_{th}$ used for PAPR reduction is gradually increased for the multiple stages of the PAPR reducing process when employing a multi-stage determination scheme. Appropriate threshold values are set in the respective stages of the PAPR reducing process in a flexible manner.

Because the PAPR reducing effect is improved in each stage of the multi-stage processing scheme, degradation of the receiving characteristic due to a nonlinear characteristic of a transmission amplifier can be prevented effectively, as compared with a case using a fixed threshold.

Next, the fifth embodiment of the invention is explained again in conjunction with FIG. 10, in which a successive determination scheme is employed. The fifth embodiment is another example of the threshold $C_{th}$ expressed by a function, and the threshold $C_{th}$ in this example is determined by $$C_{th}=C_{th,last} \times n_k/N$$

where $C_{th,last}$ denotes a last stage threshold value, $n_k$ denotes the number of subcarriers contained in the currently processed signal sequence, and N denotes the total number of subcarriers.

The N subcarriers are divided into four groups by the dividing IFFT unit, and a successive determination scheme is employed to determine cyclic shifts based on the threshold value. The saturated power level of the power amp is Ps.

To be more precise, the threshold control unit $106_1$ sets a threshold $C_{th}$ so as to satisfy $$C_{th}=C_{th,last} \times (N/2)/N = C_{th,last}/2$$

because the number of subcarriers contained in the signal sequence 5 input to the PAPR reduction control unit $108_1$ is N/2. The threshold $C_{th}$ is supplied to the PAPR reduction control unit $108_1$.

The PAPR reduction control unit $108_1$ determines an amount of cyclic shift for signal sequence 2 such that the total exceeding power level over $C_{th,last}/2$ becomes the minimum in signal sequence 5 output from the first adder $112_1$, and supplies the determined amount of cyclic shift to the cyclic shifting unit $110_1$.

The cyclic shifting unit $110_1$ applies cyclic shift to the signal sequence 2 according to the amount of cyclic shift determined by the PAPR reduction control unit $108_1$, and supplies the cyclically shifted signal sequence 2 to the first adder $112_1$.

The adder $112_1$ adds the cyclically shifted signal sequence 2 to the signal sequence 1, and outputs a combined signal sequence 5 to the second adder $112_2$.

The second threshold control unit $106_2$ sets a threshold $C_{th}$ so as to satisfy $$C_{th}=C_{th,last} \times (3N/4)/N = C_{th,last} \times (3/4)$$

because the number of subcarriers contained in the signal sequence 6 to the PAPR reduction control unit $108_2$ is 3N/4. The threshold $C_{th}$ is supplied to the PAPR reduction control unit $108_2$.

The PAPR reduction control unit $108_2$ determines an amount of cyclic shift for signal sequence 3 such that the total exceeding power level over $3 \ast C_{th,last}/4$ becomes the minimum in signal sequence 6 output from the second adder $112_2$, and supplies the determined amount of cyclic shift to the cyclic shifting unit $110_2$.

The cyclic shifting unit $110_2$ applies cyclic shift to the signal sequence 3 according to the amount of cyclic shift determined by the PAPR reduction control unit $108_2$, and supplies the cyclically shifted signal sequence 3 to the second adder $112_2$.

The adder $112_2$ adds the cyclically shifted signal sequence 3 to the combined signal sequence 5 supplied from the first adder $112_1$, and outputs a combined signal sequence 6 to the third adder $112_3$.

The threshold control unit $106_3$ sets a threshold $C_{th}$ to $C_{th,last}$ because the number of subcarriers contained in the signal sequence 7 input to the associated PAPR reduction control unit $108_3$ contains N subcarriers. The last threshold $C_{th}$ may be equal to the saturated power level Ps ($C_{th}$=Ps). The threshold $C_{th}$ is supplied to the PAPR reduction control unit $108_3$.

The PAPR reduction control unit $108_3$ determines an amount of cyclic shift for signal sequence 4 such that the total exceeding power level over the threshold $C_{th}$ becomes the minimum in signal sequence 7 output from the third adder $112_3$, and supplies the determined amount of cyclic shift to the cyclic shifting unit $110_3$.

The cyclic shifting unit $110_3$ applies cyclic shift to the signal sequence 4 according to the amount of cyclic shift determined by the PAPR reduction control unit $108_3$, and supplies the cyclically shifted signal sequence 4 to the third adder $112_3$.

The adder $112_3$ adds the cyclically shifted signal sequence 4 to the combined signal sequence 6 supplied from the second adder $112_2$, and outputs a combined signal sequence 7 as an OFDM signal.

With the OFDM transmitter of the fifth embodiment, as the number of subcarriers contained in the currently processed signal sequence increases, the PAPR reduction (clipping) threshold $C_{th}$ increases. Accordingly, the PAPR reducing effect is improved in each of the successive PAPR reducing processes, and degradation of the receiving characteristic due to a nonlinear characteristic of a transmission amplifier can be prevented effectively, as compared with a case using a fixed threshold.

Next, the sixth embodiment of the invention is explained again in conjunction with FIG. 11. In the sixth embodiment, a multi-stage determination scheme for determining a cyclic shift based on a threshold $C_{th}$ is applied to the OFDM transmitter in place of a successive determination scheme, and the threshold $C_{th}$ is determined according to $$C_{th}=C_{th,last} \times n_k/N$$

where $C_{th,last}$ denotes a last stage threshold value, $n_k$ denotes the number of subcarriers contained in the currently processed signal sequence, and N denotes the total number of subcarriers. The number of OFDM subcarriers is N, which is divided into four signal sequences by the dividing IFFT unit, and the saturated power level is Ps, as in the first through fifth embodiments.

The threshold control unit $106_1$ sets a threshold $C_{th}$ so as to satisfy $$C_{th}=C_{th,last} \times (N/2)/N = C_{th,last}/2$$

because the number of subcarriers contained in the signal sequence 5 to the PAPR reduction control unit 108₁ is N/2. The threshold $C_{th}$ is supplied to the PAPR reduction control unit 108₁.

The PAPR reduction control unit 108₁ determines an amount of cyclic shift for signal sequence 2 such that the total exceeding power level over $C_{th,last}/2$ becomes the minimum in signal sequence 5 output from the first adder 112₁, and supplies the determined amount of cyclic shift to the cyclic shifting unit 110₁.

The cyclic shifting unit 110₁ applies cyclic shift to the signal sequence 2 according to the amount of cyclic shift determined by the PAPR reduction control unit 108₁, and supplies the cyclically shifted signal sequence 2 to the first adder 112₁.

The adder 112₁ adds the cyclically shifted signal sequence 2 to the signal sequence 1, and outputs a combined signal sequence 5 to the third adder 112₃.

The second threshold control unit 106₂ sets a threshold $C_{th}$ so as to satisfy $$C_{th}=C_{th,last}\times(N/2)/N=C_{th,last}/2$$

because the number of subcarriers contained in the signal sequence 6 to the PAPR reduction control unit 108₂ is N/2. The threshold $C_{th}$ is supplied to the PAPR reduction control unit 1082.

The PAPR reduction control unit 1082 determines an amount of cyclic shift for signal sequence 4 such that the total exceeding power level over $C_{th,last}/2$ becomes the minimum in signal sequence 6 output from the second adder 112₂, and supplies the determined amount of cyclic shift to the cyclic shifting unit 110₂.

The cyclic shifting unit 110₂ applies cyclic shift to the signal sequence 4 according to the amount of cyclic shift determined by the PAPR reduction control unit 108₂, and supplies the cyclically shifted signal sequence 4 to the second adder 112₂.

The adder 112₂ adds the cyclically shifted signal sequence 4 to the signal sequence 3, and outputs a combined signal sequence 6 to the cyclic shifting unit 110₃.

The last threshold control unit 106₃ sets a threshold $C_{th}$ to $C_{th,last}$ because the number of subcarriers contained in the signal sequence 7 input to the associated PAPR reduction control unit 108₃ contains N subcarriers. The last threshold $C_{th}$ may equal to the saturated power level Ps. The threshold $C_{th}$ is supplied to the PAPR reduction control unit 108₃.

The PAPR reduction control unit 108₃ determines an amount of cyclic shift for the combined signal sequence 6 (obtained from signal sequence 3 and signal sequence 4) such that the total exceeding power level over the threshold $C_{th}$ becomes the minimum in signal sequence 7 output from the third adder 112₃, and supplies the determined amount of cyclic shift to the cyclic shifting unit 110₃.

The cyclic shifting unit 110₃ applies cyclic shift to the signal sequence 6 according to the amount of cyclic shift determined by the PAPR reduction control unit 108₃, and supplies the cyclically shifted signal sequence 6 to the third adder 112₃.

The adder 112₃ adds the cyclically shifted signal sequence 6 to the combined signal sequence 5 supplied from the first adder 112₁, and outputs a combined signal sequence 7 as an OFDM signal.

In this manner, the threshold $C_{th}$ used for PAPR reduction is determined according to the number of subcarriers contained in the currently processed signal sequence when a multi-stage determination scheme is employed. Consequently, the PAPR reducing effect is improved in each stage of the multi-stage processing scheme, and degradation of the receiving characteristic due to nonlinear characteristic of a transmission amplifier can be prevented effectively, as compared with a case using a fixed threshold.

Next, the seventh embodiment of the invention is explained again in conjunction with FIG. 10, in which a successive determination scheme is employed. The seventh embodiment is still another example of the threshold $C_{th}$ expressed by a function, and the threshold $C_{th}$ in this example is determined by $$C_{th}=C_{th,last}\times(n_k/N)-\alpha$$

where $C_{th,last}$ denotes a last stage threshold value, $n_k$ denotes the number of subcarriers contained in the currently processed signal sequence, N denotes the total number of subcarriers, and $\alpha$ denotes a constant.

The N subcarriers are divided into four groups by the dividing IFFT unit, and a successive determination scheme is employed to determine cyclic shifts based on the threshold value. The saturated power level of the power amp is Ps.

To be more precise, the threshold control unit 106₁ sets a threshold $C_{th}$ so as to satisfy $$C_{th}=C_{th,last}\times(N/2)/N-\alpha=C_{th,last}/2-\alpha$$

because the number of subcarriers contained in the signal sequence 5 input to the PAPR reduction control unit 108₁ is N/2. The threshold $C_{th}$ is supplied to the PAPR reduction control unit 108₁.

The PAPR reduction control unit 108₁ determines an amount of cyclic shift for signal sequence 2 such that the total exceeding power level over $C_{th,last}/2-\alpha$ becomes the minimum in signal sequence 5 output from the first adder 112₁, and supplies the determined amount of cyclic shift to the cyclic shifting unit 110₁.

The cyclic shifting unit 110₁ applies cyclic shift to the signal sequence 2 according to the amount of cyclic shift determined by the PAPR reduction control unit 108₁, and supplies the cyclically shifted signal sequence 2 to the first adder 112₁.

The adder 112₁ adds the cyclically shifted signal sequence 2 to the signal sequence 1, and outputs a combined signal sequence 5 to the second adder 112₂.

The second threshold control unit 106₂ sets a threshold $C_{th}$ so as to satisfy $$C_{th}=C_{th,last}\times(3N/4)/N-\alpha=C_{th,last}\times(3/4)-\alpha$$

because the number of subcarriers contained in the signal sequence 6 input to the PAPR reduction control unit 108₂ is 3N/4. The threshold $C_{th}$ is supplied to the PAPR reduction control unit 108₂.

The PAPR reduction control unit 108₂ determines an amount of cyclic shift for signal sequence 3 such that the total exceeding power level over $3*C_{th,last}/4-\alpha$ becomes the minimum in signal sequence 6 output from the second adder 112₂, and supplies the determined amount of cyclic shift to the cyclic shifting unit 110₂.

The cyclic shifting unit 110₂ applies cyclic shift to the signal sequence 3 according to the amount of cyclic shift determined by the PAPR reduction control unit 108₂, and supplies the cyclically shifted signal sequence 3 to the second adder 112₂. The adder 112₂ adds the cyclically shifted signal sequence 3 to the combined signal sequence 5 supplied from the first adder 112₁, and outputs a combined signal sequence 6 to the third adder 112₃.

The threshold control unit $106_3$ sets a threshold $C_{th}$ to the saturated power level Ps. The threshold $C_{th}$ is supplied to the PAPR reduction unit $108_3$.

The PAPR reduction control unit $108_3$ determines an amount of cyclic shift for signal sequence 4 such that the total exceeding power level over the threshold $C_{th}$ becomes the minimum in signal sequence 7 output from the third adder $112_3$, and supplies the determined amount of cyclic shift to the cyclic shifting unit $110_3$.

The cyclic shifting unit $110_3$ applies cyclic shift to the signal sequence 4 according to the amount of cyclic shift determined by the PAPR reduction control unit $108_3$, and supplies the cyclically shifted signal sequence 4 to the third adder $112_3$.

The adder $112_3$ adds the cyclically shifted signal sequence 4 to the combined signal sequence 6 supplied from the second adder $112_2$, and outputs a combined signal sequence 7 as an OFDM signal.

With the OFDM transmitter of the seventh embodiment, the threshold value is appropriately adjusted according to the successively progressing PAPR reducing processes. Consequently, degradation of the receiving characteristic caused by use of a nonlinear transmission amplifier can be prevented. By using a constant α in the function defining the threshold $C_{th}$, the threshold is determined more accurately.

Although in the seventh embodiment, a constant α is used, α may be a function (for example, α=f(x), where f(x) is a decreasing function and x is the current PAPR processing number).

The above-described method can also be applied to the OFDM transmitter employing a multi-stage determination scheme illustrated in FIG. 11.

Figure 12:
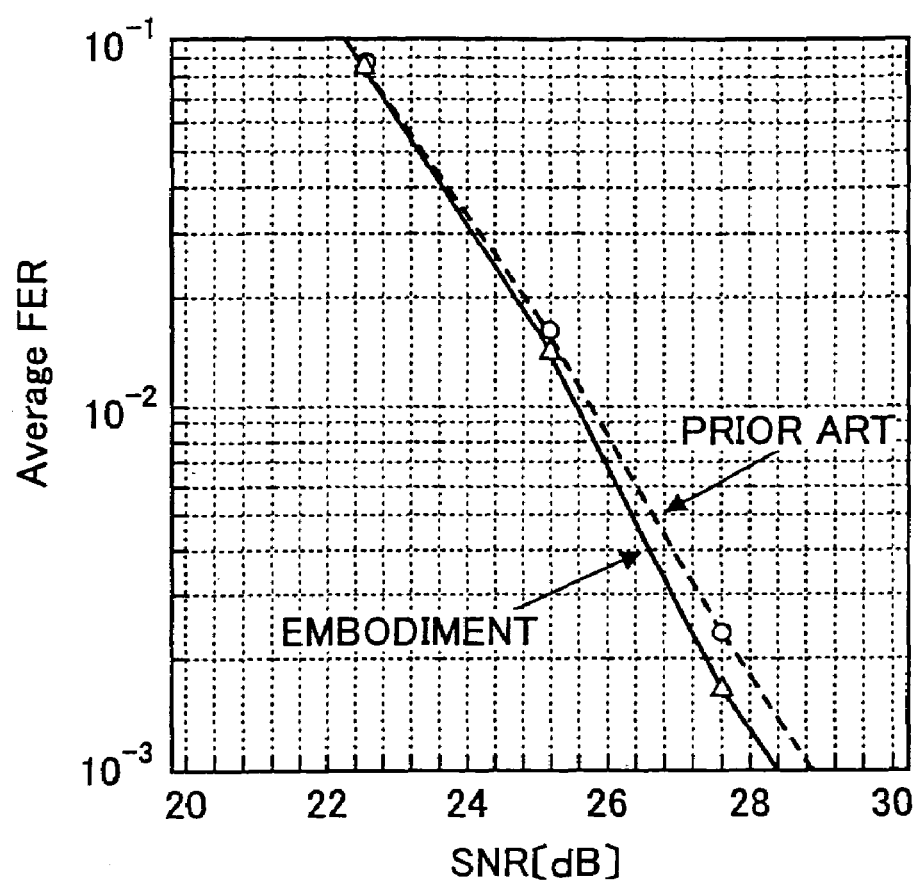
FIG. 12 is a graph showing the receiving characteristic obtained by an embodiment as compared with a conventional technique.

FIG. 12 is a graph showing the receiving FER (frame error rate) characteristic of the fifth embodiment in which a threshold is determined according to the number of subcarriers contained in the currently processed signal sequence in a successive determination scheme, as compared with a conventional technique in which a fixed threshold value is used in a PAPR reducing process. In both cases, a nonlinear transmission power is used. As to the parameters, the number of subcarriers is 256, the number of divided blocks is eight (8), and the number of patterns is sixteen (16). The frame length is 10 symbols, the channel is a quasi-static 6-path Rayleigh fading channel, and an error correction code is a convolution code with a coding rate of ½ and a constraint length of 5. From the graph, it is understood that with the method of the embodiment the SNR is improved by 1 dB or more at FER=$10^{-3}$.

As has been described above, even when a nonlinear transmission amplifier is used in an OFDM transmitter, degradation of the receiving characteristic can be reduced because two or more clipping threshold levels are appropriately determined for iterative or parallel PAPR reducing processes, unlike the conventional technique using a fixed threshold level.

Although the invention has been described based on specific examples, the invention is not limited to the examples. There are many modifications and substitutions apparent for those people with an ordinary skill in the art within the scope of the invention. For example, although two or more threshold control units are used in the embodiments, a single threshold control unit may be used to determine two or more threshold levels for two or more PAPR reducing processes. If N signal sequences are output from the dividing IFFT unit, at most N−1 threshold values are determined.

This patent application is based on and claims the benefit of the earlier filing date of Japanese Patent Application No. 2005-039174 filed Feb. 16, 2005, the entire contents of which are hereby incorporated by reference.

What is claimed is:

1. An OFDM transmitter configured to perform a peak reduction process in a stepwise manner on a signal sequence to be transmitted to transmit a peak processed transmission signal, comprising:

a dividing inverse fast Fourier transform unit configured to divide the signal sequence to be transmitted into N signal sequences and perform inverse fast Fourier transform on each of the divided signal sequences to output N time signal sequences, wherein N≧3;

a threshold control unit configured to determine at least two threshold values used in the stepwise peak reduction process;

a first peak reduction processing unit, including a first peak to average power ratio (PAPR) reduction control unit, a first cyclic shifting unit, and a first adder, wherein the first PAPR reduction control unit is configured to determine a first amount of cyclic shift to be applied to a first time signal sequence of the N time signal sequences based on a first one of the at least two threshold values, the first cyclic shifting unit is configured to apply cyclic shift to the first time signal sequence according to the determined first amount of cyclic shift, and to produce a first cyclically shifted time signal sequence, and the first adder is configured to add the first cyclically shifted time signal sequence and a second time signal sequence of the N time signal sequences to output a first peak processed time signal sequence, wherein the first amount of cyclic shift is selected from plural amounts of cyclic shift to minimize an exceeding power level over the first threshold value in the first peak processed time signal sequence;

a second peak reduction processing unit, including a second PAPR reduction control unit, a second cyclic shifting unit, and a second adder, wherein the second PAPR reduction control unit is configured to determine a second amount of cyclic shift to be applied to a third time signal sequence of the N time signal sequences based on a second one of the at least two threshold values, the second cyclic shifting unit is configured to apply cyclic shift to the third time signal sequence according to the determined second amount of cyclic shift, and to produce a second cyclically shifted time signal sequence, and the second adder is configured to add the second cyclically shifted time signal sequence and the first peak processed time signal sequence to output a second peak processed signal sequence, wherein the second amount of cyclic shift is selected from plural amounts of cyclic shift so as to minimize an exceeding power level over the second threshold value in the second peak processed time signal sequence; and a power amplifier configured to amplify the second peak processed time signal sequence, wherein, the at least two threshold values are equal to or smaller than a saturated power level of the power amplifier.

2. The OFDM transmitter of claim 1, wherein the second peak reduction processing unit performs a last step of the peak reduction process, and the second threshold value used in the second peak reduction processing unit is equal to the saturated power level of the power amplifier, and the first threshold value used in the first peal reduction processing unit is less than the saturated power level.

3. The OFDM transmitter of claim 1, wherein said at least two threshold values are prescribed constants.

4. The OFDM transmitter of claim 1, wherein the threshold control unit determines said at least two threshold values expressed by an increasing function.

5. The OFDM transmitter of claim 4, wherein the threshold control unit determines each of said at least two threshold values $C_{th}$ according to $$C_{th}=C_{th,last}\times(n_k/N)$$

where $C_{th,last}$ is a last threshold value used in a last step of the peak reduction process, $n_k$ is a number of subcarriers contained in a currently processed time signal sequence, and N is the total number of subcarriers contained in the signal to be transmitted.

6. The OFDM transmitter of claim 4, wherein the threshold control unit determines each of said at least two threshold values $C_{th}$ according to $$C_{th}=C_{th,last}\times(n_k/N)-\alpha$$

where $C_{th,last}$ is a last threshold value used in a last step of the peak reduction process, $n_k$ is a number of subcarriers contained in a currently processed time signal sequence, N is the total number of subcarriers contained in the signal to be transmitted, and $\alpha$ is a threshold modification value.

7. The OFDM transmitter of claim 6, wherein $\alpha$ is set to zero in the last step of the peak reduction process, and is set to a constant in a step other than the last step.

8. The OFDM transmitter of claim 6, wherein $\alpha$ is set to zero in the last step of the peak reduction process, and is a decreasing function in a step other than the last step.

9. An OFDM transmitter configured to perform a peak reduction process in a stepwise manner on a signal sequence to be transmitted to transmit a peak processed OFDM transmission signal, comprising:

a dividing inverse fast Fourier transform unit configured to divide the signal sequence to be transmitted into N signal sequences and perform inverse fast Fourier transform on each of the divided signal sequences to output N time signal sequences, wherein N≧4 a threshold control unit configured to determine at least three threshold values used in the stepwise peak reduction process; and a first peak reduction processing unit, including a first peak to average power ratio (PAPR) reduction control unit, a first cyclic shifting unit, and a first adder, wherein the first PAPR reduction control unit is configured to determine a first amount of cyclic shift to be applied to a first time signal sequence of the N time signal sequences based on a first one of the at least three threshold values, the first cyclic shifting unit is configured to apply cyclic shift to the first time signal sequence according to the determined first amount of cyclic shift, and to produce a first cyclically shifted time signal sequence, and the first adder is configured to add the first cyclically shifted time signal sequence and a second time signal sequence of the N time signal sequences to output a first peak processed time signal sequence, wherein the first amount of cyclic shift is selected from plural amounts of cyclic shift so as to minimize an exceeding power level over the first threshold value in the first peak processed time signal sequence; and a second peak reduction processing unit, including a second PAPR reduction control unit, a second cyclic shifting unit, and a second adder, wherein the second PAPR reduction control unit is configured to determine a second amount of cyclic shift to be applied to a third time signal sequence of the N time signal sequences based on a second one of the at least three threshold values, the second cyclic shifting unit is configured to apply cyclic shift to the third time signal sequence according to the determined second amount of cyclic shift, and to produce a second cyclically shifted time signal sequence, and the second adder is configured to add the second cyclically shifted time signal sequence and a fourth time signal sequence of the N time signal sequences to output a second peak processed signal sequence, wherein the second amount of cyclic shift is selected from plural amounts of cyclic shift so as to minimize an exceeding power level over the second threshold value in the second peak processed time signal sequence; and a third peak reduction processing unit, including a third PAPR reduction control unit, a third cyclic shifting unit, and a third adder, wherein the third PAPR reduction control unit is configured to determine a third amount of cyclic shift to be applied to the first peak processed time signal sequence based on a third one of the at least three threshold values, the third cyclic shifting unit is configured to apply cyclic shift to the first peak processed time signal sequence according to the determined third amount of cyclic shift, and to produce a third cyclically shifted time signal sequence; and the third adder is configured to add the third cyclically shifted time signal sequence and the second peak processed time signal sequence to output a third peak processed signal sequence, wherein the third amount of cyclic shift is selected from plural amounts of cyclic shift so as to minimize an exceeding power level over the third threshold value in the third peak processed time signal sequence; and a power amplifier configured to amplify the third peak processed time signal sequence, wherein, the at least three threshold values are equal to or smaller than a saturated power level of the power amplifier.

10. The OFDM transmitter of claim 9, wherein the third peak reduction processing unit performs a last step of the peak reduction process, and the third threshold value used in the third peak reduction processing unit is equal to the saturated power level of the power amplifier, and the first and two threshold values are less than the saturated power level.

11. The OFDM transmitter of claim 9, wherein said at least three threshold values are prescribed constants.

12. The OFDM transmitter of claim 9, wherein the threshold control unit determines said at least three threshold values expressed by an increasing function.

13. The OFDM transmitter of claim 12, wherein the threshold control unit determines each of said at least three threshold values $C_{th}$, according to $$C_{th}=C_{th,last}\times(n_k/N)$$

wherein $C_{th,last}$ is a last threshold value used in a last step of the peak reduction process, $n_k$ is a number of subcarriers contained in a currently processed time signal sequence, and N is the total number of subcarriers contained in the signal to be transmitted.

14. The OFDM transmitter of claim 12, wherein the threshold control unit determined each of said at least three threshold values $C_{th}$ according to $$C_{th} = C_{th,last} \times (n_k/N) - \alpha$$

wherein $C_{th,last}$ is a last threshold value used in a last step of the peak reduction process, $n_k$ is a number of subcarriers contained in a currently processed time signal sequence, N is the total number of subcarriers contained in the signal to be transmitted, and $\alpha$ is a threshold modification value.

15. The OFDM transmitter of claim 14, wherein $\alpha$ is set to zero in the last step of the peak reduction process, and is set to a constant in a step other than the last step.

16. The OFDM transmitter of claim 14, wherein $\alpha$ is set to zero in the last step of the peak reduction process, and is a decreasing function in a step other than the last step.

* * * * *